United States Patent [19]
Di Giacomo

[11] 3,864,609
[45] Feb. 4, 1975

[54] FUEL IMMERSIBLE CAPACITOR FOR MEASUREMENT OF DIELECTRIC CONSTANT OF LIQUID FUEL IN A TANK

[75] Inventor: Sebastian F. Di Giacomo, Merrick, N.Y.

[73] Assignee: Gull Airborne Instruments, Inc., Smithtown, N.Y.

[22] Filed: Jan. 2, 1974

[21] Appl. No.: 429,896

Related U.S. Application Data
[62] Division of Ser. No. 237,718, March 24, 1972, Pat. No. 3,798,515.

[52] U.S. Cl............. 317/249 R, 317/246, 324/60 R
[51] Int. Cl............................................... H01g 5/01
[58] Field of Search......... 324/65 R, 60 R; 317/246, 317/249 R

[56] References Cited
UNITED STATES PATENTS
| | | | |
|---|---|---|---|
| 2,759,134 | 8/1956 | Sullivan | 317/246 |
| 3,123,751 | 3/1964 | Balsbaugh | 317/246 |

*Primary Examiner*—E. A. Goldberg
*Attorney, Agent, or Firm*—Cooper, Dunham, Clark, Griffin & Moran

[57] ABSTRACT

Capacitance apparatus for measuring the mass of liquid fuel in the tanks of an aircraft. The capacitance elements and other parts of the circuits are designed to have very high accuracy, so that no calibrating adjustment is required during or after installation. Fuel level measuring capacitors are provided, as well as capacitors for compensating for changes in the dielectric constant of the fuel.

5 Claims, 9 Drawing Figures

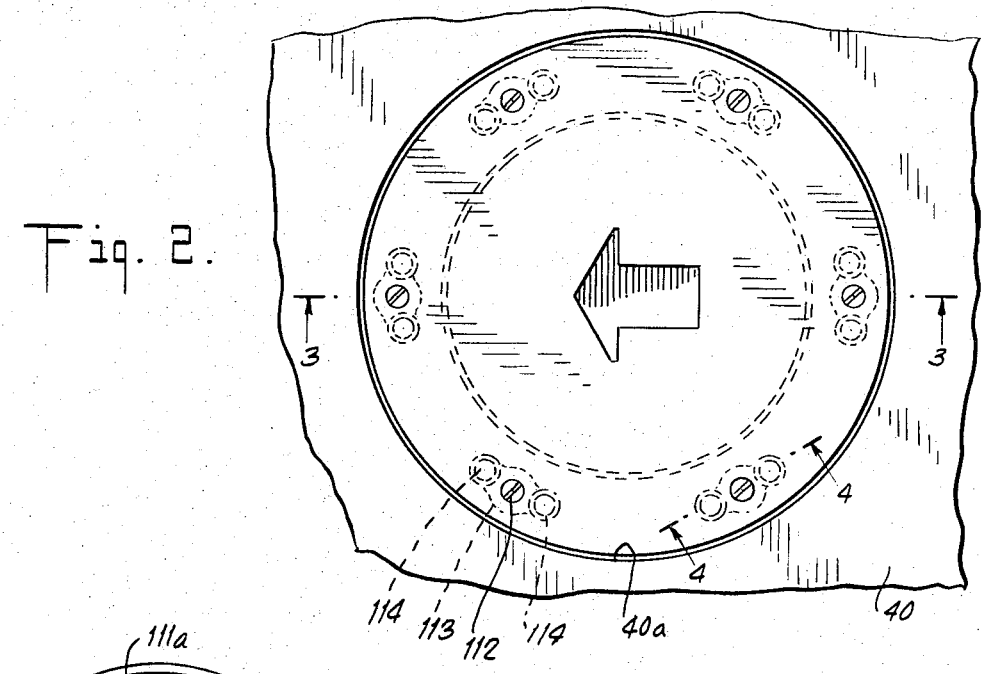
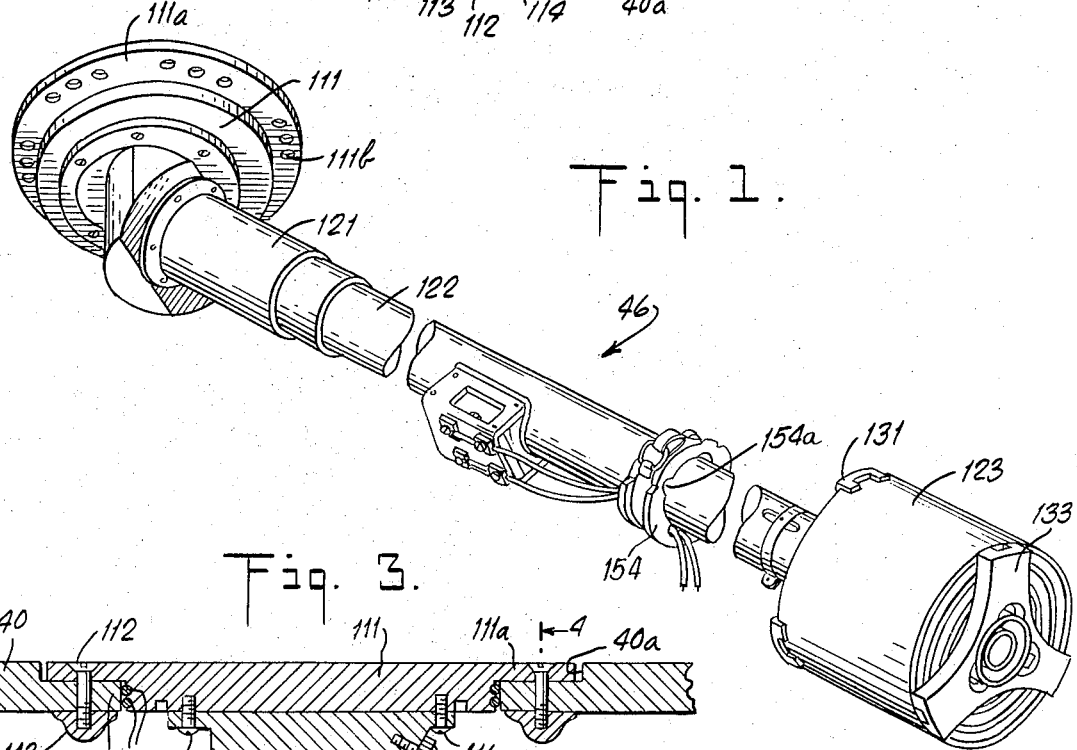
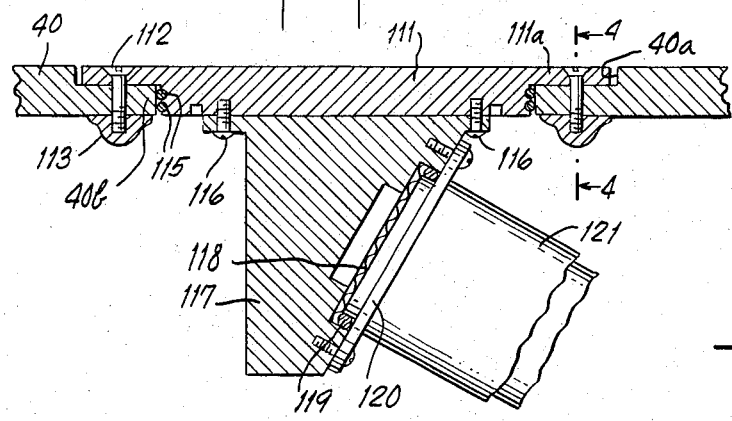
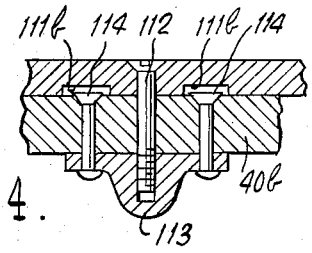

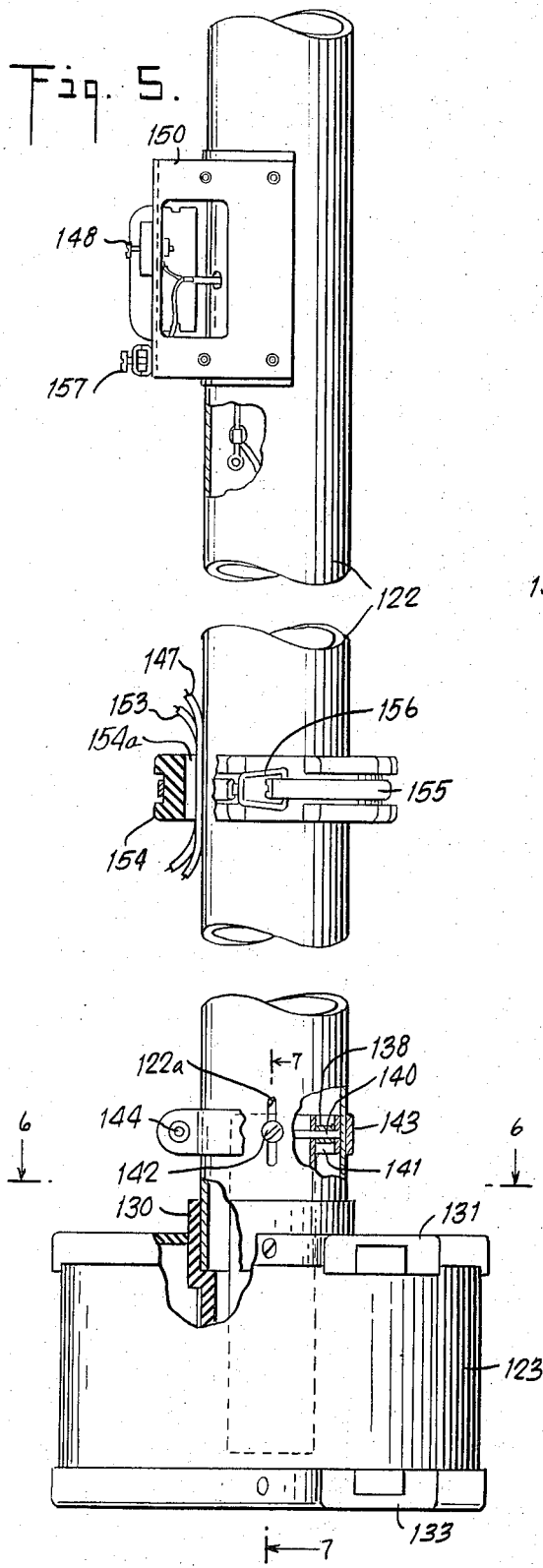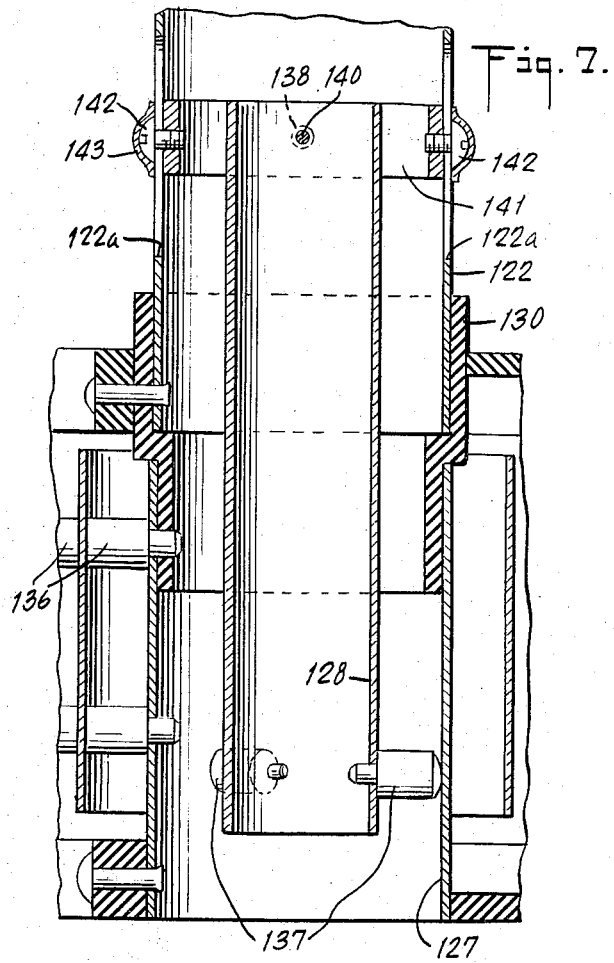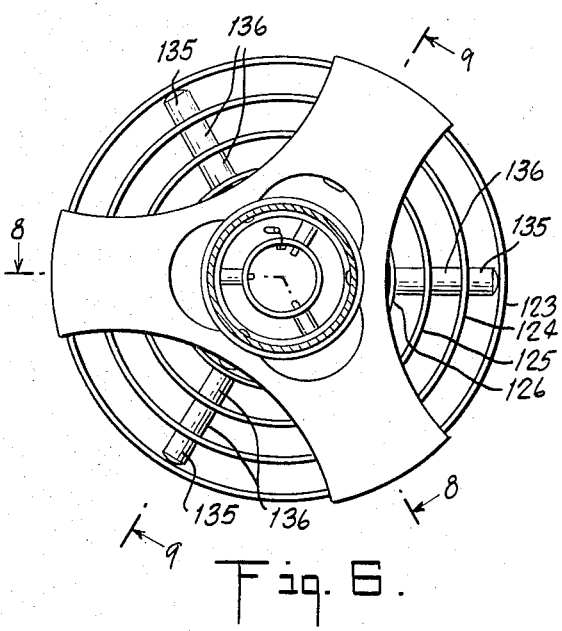

3,864,609

FUEL IMMERSIBLE CAPACITOR FOR MEASUREMENT OF DIELECTRIC CONSTANT OF LIQUID FUEL IN A TANK

CROSS-REFERENCE

This application is a division of my application Ser. No. 237,718 filed Mar. 24, 1972, now U.S. Pat. No. 3,798,515, issued Mar. 19, 1974, entitled "Fuel Immersible Capacitor for Measurement of Liquid Fuel in a Tank."

The apparatus described in this application is intended for use with the digital indicating and control system shown and described in the copending application of Walter Hersch and Ira A. Rubel, Ser. No. 275,765, filed July 27, 1972 now U.S. Pat. No. 3,830,090, issued Aug. 20, 1974. The present invention has substantial utility, however, in connection with other indicating and control systems.

BRIEF SUMMARY OF THE INVENTION

Fuel mass measuring apparatus includes, in each tank in which the fuel is to be measured, at least one level measuring capacitor, one compensating capacitor, and a fault isolation probe. These capacitors and the probe are capable of functioning either when immersed in fuel or when not so immersed. The terminals of each capacitor in a tank are connected to terminals on the fault isolation probe of that tank through slack conductors. Sufficient slack is allowed in the conductors so that the isolation probe with its terminals may be withdrawn from the tank without disconnecting the conductors, thereby giving access at the terminals to electrical connections to each capacitor individually. The separate capacitors may be tested by the use of those connections.

Other slack wire connections extend form the fault isolation probe to a connector in a bulkhead wall of the tank. From the other side of the connector, conductors extend to an electrical measuring system including a potential supply means, a balanceable circuit, and indicator, and means responsive to a potential in the circuit for rebalancing the circuit and driving the indicator.

The compensating capacitor of the invention comprises a plurality of concentric cylinders held against lateral movement with respect to each other by a plurality of arrays of interfitting radially extending insulating buttons. One set of alternate concentric plates of the compensating capacitor are electrically connected to each other and to a terminal of the capacitor. The other set of alternating plates, including the innermost plate, are electrically connected to each other and to the other capacitor terminal. The innermost plate is slidable axially of the array of concentric cylindrical plates to vary the capacitance for calibration purposes. The innermost plate extends axially beyond the other plates and has its extending end mounted on a ring slidable in an elongated support tube, which also supports the other concentric cylinders. The calibration adjustment is accomplished by sliding that ring axially and fixing it in place by means of screw and slot connections. The support tube is mounted at its outer end on a flanged plate. The inner end of the support tube, which carries the compensating capacitor, has an insulating sleeve fitted thereon. The sleeve has an inner shoulder against which the end of the support tube abuts. The sleeve also has an outer shoulder against which the end of the innermost one of the other cylindrical capacitor elements abuts.

DRAWINGS

FIG. 1 is a perspective view of a compensating capacitor constructed in accordance with the invention.

FIG. 2 is a plan view of the mounting plate of a compensating capacitor mounted in place on an aircraft wing.

FIG. 3 is a sectional view on the line 3—3 of FIG. 2.

FIG. 4 is a sectional view taken on the line 4—4 of FIG. 3.

FIG. 5 is a fragmentary elevational view of the capacitor of FIG. 1, on a larger scale.

FIG. 6 is a view on the line 6—6 of FIG. 5.

FIG. 7 is a sectional view on the line 7—7 of FIG. 5.

DETAILED DESCRIPTION

Figure 9:
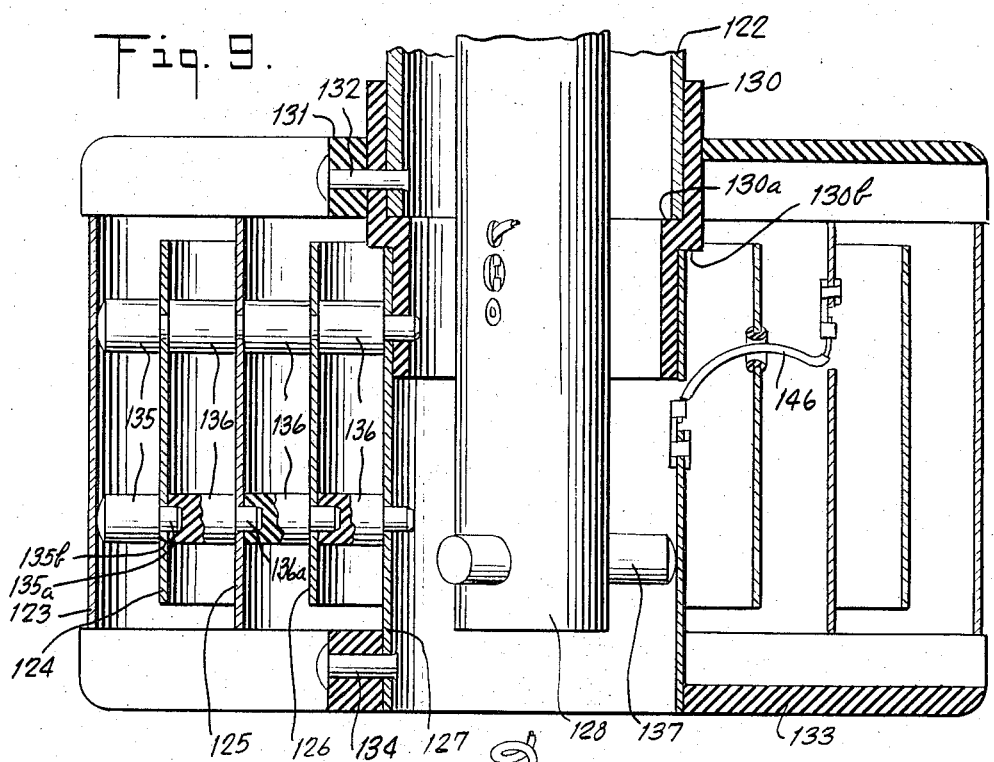
FIG. 9 is a sectional view on the line 9—9 of FIG. 6, on an enlarged scale

The drawings illustrate a compensating capacitor constructed in accordance with the invention. The compensating capacitor is intended to be located near the bottom of a fuel tank, so that its capacitance varies only with changes in the dielectric constant of the fuel in the tank, and not with changes in fuel level. The compensating capacitor is mounted on a flanged plate 111 which is adapted to be inserted in a mating opening in an upper surface of an aircraft wing 40. The skin of the wing 40 serves as both wing surface and as the upper wall of the fuel tank. The plate 111 has a flange 111a extending around its periphery and adapted to fit within a recess 40a in the upper surface of the wing 40. A plurality of flush head screws 112 extend through the flange 111a and a corresponding flange 40b on the wing 40. The lower ends of the screws 112 are received in dome nuts 113. Each dome nut 113 is fastened to the flange 40b of the airplane wing by means of rivets 114 having flush heads. The heads of the rivets 114 are nominally flush with the surface of the flange 40b. Nevertheless, in some instances the head of a rivet 114 may project slightly above the surface 40b, because of a build up of tolerances in the dimensions of the rivet, the wing flange 40b and the dome nut 113. It is desirable to maintain as good electrical contact as possible between the wing flange 40b and the flange 111a of plate 111, so as to facilitate the discharge of lightning which might otherwise discharge rapidly from a projecting rivet head, thereby creating a spark. In order to prevent such spark discharges, the flange 111a is provided with recesses 111b in alignment with each rivet head, and somewhat larger in diameter than the rivet head, so that the rivet head may project upwardly slightly above the surface of the flange 40b without coming into contact with the under surface of the flange 111a.

Sealing rings 115, which may be O-rings, are provided between the plate 111 and the inner periphery of the flanges 40b.

Mounted on the under side of the plate 111 by means of screw 116 is a block 117 having a slanting face on which is fastened a flange 120 attached to a resilient sleeve 121 which encircles and is attached to the upper end of a support tube 122. A wave washer 118 and an O-ring wave washer 119 cooperate with the sleeve 121 and flange 120 to provide a resilient support for tube 122.

At its lower end, the support tube 122 carries six concentric cylindrical plates, respectively identified by the numbers 123, 124, 125, 126, 127 and 128.

An insulating sleeve 130 encircles the lower end of the tube 122 and is provided with an internal shoulder 130a, against which the end of the tube 122 abuts. The sleeve 130 also has an external shoulder 130b spaced downwardly from the shoulder 130a, against which the upper end of the cylindrical plate 127 abuts. The sleeve 130 and a spider 131 of insulating material are connected to the lower end of the tube 122 by means of a plurality of rivets, one of which is shown at 132. Another insulating spider 133 is attached to the lower end of the cylindrical plate 127 by means of rivets, one of which is shown at 134. The spiders 131 and 133 engage the ends of the plates 123 and 125 and hold them against axial movement. The plates 123, 124, 125, 126 and 127 are restrained agianst rotational and lateral movement with respect to each other by means of a plurality of rows of interfitting buttons 135 and 136 (FIG. 9). The outermost buttons 135 have on their outer ends convex surfaces adapted to engage the inner surface of the outermost plate 123. On their inner ends, buttons 135 have a shank 135a encircled by a shoulder 135b. The shank extends through a hole in the next adjacent plate 124 and thence into a recess in the outer end of the next interfitting button 136. The shoulder 135b engages the outer surface of the plate 124 around the hole which receives the shank 135.

The buttons 136 are alike, having on their outer ends a central recess for receiving the shank on the next outer button surrounded by a surface contoured to engage the inner surface of a capacitor plate. Each button 136 has on its inner end a shank 136a which projects through a hole on the next adjacent inner capacitor plate and into the recess on the next button 136. In the structure illustrated, there are two tiers of buttons 135, 136, as may be seen in FIG. 7. Each tier of buttons comprises three rows of buttons 135, 136, as may be seen in FIG. 6. The particular number of tiers of buttons and the particular number of rows are not critical. It is only necessary that a sufficient number of tiers and rows be provided to maintain the cylindrical capacitor plates in proper spaced relation.

The innermost capacitor plate 128 has its lower end maintained concentric with the capacitor plate 127 by means of three buttons 137 similar in structure to the buttons 138. The upper end of the plate 128 is supported by a pin 140 extending diametrically through the plate 128 and also through an insulating ring 141 having a sliding fit within the support tube 122. Spacers 138 encircle pin 140 and maintain the spacing between plate 128 and ring 141. The tube 122 is provided with a pair of diametrically opposite longitudinal slots 122a (see FIG. 5). A pair of screws 142 extend through the slots 122a and into the ring 141. By tightening the screws 142, the axial position of the ring 141 and hence of the plate 128 may be fixed. By loosening the screws 142, the ring 141 and plate 128 may be moved longitudinally of the assembly of capacitor plates to vary the capacitance of the capacitor unit.

This is a calibrating adjustment which is made at the factory. After the adjustment is made, a strap 143 is placed around the screw 142 and the support tubes 122 and has its ends fastened by a rivet or eyelet 144.

Figure 8:
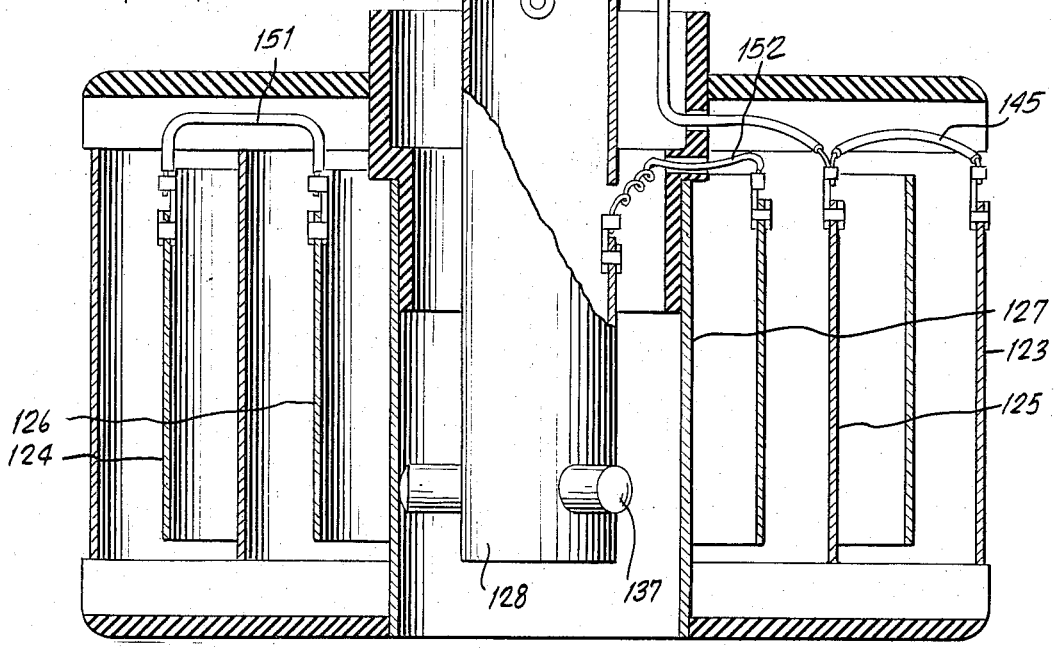
FIG. 8 is a sectional view on the line 8—8 of FIG. 6, on an enlarged scale.

One set of alternate concentric plates 123, 125 and 127 are connected together by conductors 145 and 146 (FIGS. 8 and 9) and through a conductor 147 to a terminal 148 on a terminal board 150 mounted on the outside of the support tube 122. The other set of plates 124, 126 and 128 are connected together by conductors 151 and 152, and by a conductor 153 to another terminal (not shown) mounted on a terminal board 150. The conductors 147 and 153 pass between a clamping ring 154 and the support tube 122. The clamping ring 154 is provided with recesses 154a on its inner side to accommodate the conductors. A strap 155 with a toggle connection 156 at its end encircles the ring 154. The ring 154 is made up of two semicircular parts hinged together and held in place by the straps 155. Another strain relief connection 157 is provided on the terminal board 150 to prevent the transmission of any strain through the wires to the terminals 148.

The capacitor 46 illustrated is designed to operate at a frequency of about 10 khz. By the use of this frequency, it is possible to use capacitors which are physically much larger than those used in prior art (commonly power frequency) fuel gaging systems. Furthermore, since the capacitors are much larger, and the spacing between the plates is greater, the capacitance of the capacitors is much less affected by minor variations in plate spacing than is the case with the prior art systems. The capacitors are also much less susceptible to contaminants in the dielectric than the prior art capacitors. These contaminants are a major cause of degraded performance in the prior art systems. This is especially important for the compensating capacitors, which are located at the bottom of the tank where contaminants tend to collect. It is therefore feasible to make all calibrating adjustments at the factory and to avoid the necessity and even the desirability of making such adjustments in the field. The locking bands and rivets are provided to cover the calibrating adjustment mechanisms to prevent the field personnel from getting ready access to them In the compensating capacitors 46 shown, the spacing between the plates is 0.470 inch, whereas the widest spacing in prior art capacitors was 0.125 inch. These figures are presented by way of example to indicate the order of magnitude of the difference between the capacitors of the present invention and those of the prior art

I claim:

1. Capacitor means adapted to be immersed in a fluid and to have its capacitance vary with the dielectric constant of the fluid, comprising:
   a. a plurality of pairs of concentric cylindrical plates;
   b. two terminals;
   c. means electrically connecting one set of radially alternate plates together to one terminal;
   d. means electrically connecting the other set of radially alternate plates together to the other terminal:
   e. said plates being held against relative radial and longitudinal movement by a plurality of radial rows of interfitting insulating radial buttons;
   f. each button except the outermost in each row having on its inner end a shoulder encircling a shank received in an aperture in the inner one of the adjacent plates, and having on its outer end a convex surface engaging the inner surface of the outer one of the two adjacent plates, said surface encircling a recess receiving the shank on the next outermost button; and g. the outermost button of the row having a convex surface on its outer end to engage the inner surface of the outermost plate.

2. Capacitor means as in claim 1, including:

a. support means comprising an elongated tube mounted at one end on a fixed support and electrically connected to ground; and b. an insulating sleeve encircling the other end of said tube and having an internal shoulder abutting the end of said tube, said sleeve projecting beyond the end of said tube and having an external shoulder abutting one of said cylindrical plates.

3. Capacitor means as in claim 2, including:

a. means for adjusting the innermost one of said plates axially to vary the capacitance of the capacitor means, said adjusting means comprising a supporting ring slidably mounted within said tube; and b. adjustable means for fixing the longitudinal position of said ring along the tube.

4. Capacitor means as in claim 3, including:

a. means on said sleeve supporting one end of said innermost plate;

b. a plurality of radially extending insulating buttons supporting the other end of said innermost plate, each said button having a convex outer end surface engaging the inner surface of the next adjacent plate, and a shoulder on its inner end encircling a shank, said shoulder engaging said innermost plate and said shank projecting through an aperture in said innermost plate.

5. Capacitor means adapted to be immersed in a fluid and to have its capacitance vary with the dielectric constant of the fluid, comprising:

a. a plurality of pairs of concentric cylindrical plates;

b. two terminals;

c. means electrically connecting one set of radially alternate plates together to one terminal;

d. means electrically connecting the other set of radially alternate plates together to the other terminal;

e. support means comprising an elongated tube mounted at one end on a fixed support and electrically connected to ground, said tube having a longitudinal slot adjacent its other end;

f. means mounting both said sets of plates on said support means, said mounting means including:

1. means for adjusting the innermost one of said plates axially to vary the capacitance of the capacitor means;

2. said adjusting means comprising a supporting ring slidably mounted within said tube, and a screw extending through said slot and threadedly engaging said ring, said screw having a head engageable with the tube alongside the slot to hold the ring fixed in position; and 3. a locking band encircling the tube and the head of the screw, said locking band having its end permanently connected to prevent change in the capacitance except by deformation of the permanent connection between the ends of the band.

* * * * *